United States Patent
Aparicio Durán et al.

(10) Patent No.: US 8,467,998 B2
(45) Date of Patent: Jun. 18, 2013

(54) COMPUTER-AIDED METHOD FOR PREDICTING PARTICLE UPTAKE BY A SURFACE OF A MOVING OBJECT

(75) Inventors: José Antonio Aparicio Durán, Madrid (ES); José Manuel Alonso Rodriguez, Madrid (ES)

(73) Assignee: Airbus Operations S.L., Madrid (ES)

( * ) Notice: Subject to any disclaimer, the term of this patent is extended or adjusted under 35 U.S.C. 154(b) by 813 days.

(21) Appl. No.: 12/006,260

(22) Filed: Dec. 31, 2007

(65) Prior Publication Data

US 2009/0171633 A1   Jul. 2, 2009

(30) Foreign Application Priority Data

Oct. 31, 2007   (ES) .................................. 200702871

(51) Int. Cl.
   *G06F 17/00*   (2006.01)
(52) U.S. Cl.
   USPC ....................................... 703/2; 703/6; 703/9
(58) Field of Classification Search
   USPC .................................................. 703/1, 2, 8, 9
   See application file for complete search history.

(56) References Cited

U.S. PATENT DOCUMENTS

| | | | |
|---|---|---|---|
| 5,568,404 A * | 10/1996 | Strumolo ..................... | 702/140 |
| 6,529,860 B1 * | 3/2003 | Strumolo et al. ............. | 703/8 |
| 6,975,971 B2 * | 12/2005 | Tang ............................ | 703/1 |
| 7,210,322 B2 * | 5/2007 | Iwata ........................... | 72/53 |
| 7,237,679 B1 * | 7/2007 | Hendrickson et al. ....... | 209/638 |
| 7,476,851 B2 * | 1/2009 | Wang et al. .................. | 250/288 |
| 8,014,568 B2 * | 9/2011 | Lojewski ..................... | 382/103 |
| 2004/0041507 A1 * | 3/2004 | Ito ................................ | 313/292 |
| 2005/0257835 A1 * | 11/2005 | Midtgard et al. ............. | 137/487.5 |
| 2006/0102837 A1 * | 5/2006 | Wang et al. .................. | 250/288 |
| 2007/0112454 A1 * | 5/2007 | Iwata ........................... | 700/160 |
| 2007/0196768 A1 * | 8/2007 | Ogino .......................... | 430/296 |
| 2007/0209586 A1 * | 9/2007 | Ebensberger et al. ....... | 118/682 |
| 2009/0016598 A1 * | 1/2009 | Lojewski ..................... | 382/154 |
| 2009/0086506 A1 * | 4/2009 | Okumura ..................... | 362/613 |
| 2009/0325085 A1 * | 12/2009 | Yoshida et al. .............. | 430/5 |
| 2012/0065947 A1 * | 3/2012 | Yu ................................ | 703/2 |
| 2012/0150496 A1 * | 6/2012 | Yu ................................ | 703/2 |
| 2012/0279694 A1 * | 11/2012 | Kamiya et al. .............. | 165/180 |

OTHER PUBLICATIONS

Y. Bourgault, W. Habashi, J. Dompierre, and G. Baruzzi, "A Finite Element Method study of Eulerian Droplets Impingement Models", John Wiley & Sons, Ltd., pp. 429-449, 1999.*

Y.Y Bourgault, W. Habashi, J. Dompierre, and G. Baruzzi, "A Finite Element Method study of Eulerian Droplets Impingement Models", John Wiley & Sons, Ltd., pp. 429-449, 1999.*

* cited by examiner

*Primary Examiner* — Saif Alhija
*Assistant Examiner* — Kibrom Gebresilassie
(74) *Attorney, Agent, or Firm* — Ladas & Parry LLP

(57) ABSTRACT

A computer-aided method for predicting particle uptake by a surface of an object moving in a flow current. The method includes preparing a discrete model of the object and the surrounding flow, including a projection area for projecting the particles formed by a mesh of cells with an identical size, and a mesh of cells of the surface. The method also includes simulating the projection of particles with a different size from the projection area on the surface, both the density $D_i$ of projected particles and their size distribution being identical for the cell. The method further includes obtaining for each cell of the surface the local uptake efficiency parameter by dividing the density $D_f$ of particles impacting against the cell by the density $D_i$ of particles projected from the projection area.

2 Claims, 2 Drawing Sheets

COMPUTER-AIDED METHOD FOR PREDICTING PARTICLE UPTAKE BY A SURFACE OF A MOVING OBJECT

FIELD OF THE INVENTION

The present invention relates to a computer-aided method for predicting particle uptake by a surface of an object moving in a flow current and more particularly, for predicting water droplet uptake by an aircraft surface.

BACKGROUND OF THE INVENTION

The authorities require the certification that aircraft meet certain requirements so that they can fly, which requirements ensure their operability in meteorological conditions favoring continuous or intermittent ice formation.

There are many types of problems caused by ice in airplanes. During the landing, the airplane can descend with an intermediate speed from a cold and dry flight altitude to a normal situation on the ground passing through cloudy areas in which moisture or water particles can freeze on the airplane surfaces that are still cold. This can cause a weight increase and a change in the aerodynamic shape especially in the leading edges of wings, tail stabilizers and engine air intake ducts. At an altitude of 17,000 feet and 10,000 feet, the types of ice causing risks are different. In airfoils with ice, the aerodynamic behavior changes dramatically in a low-speed landing configuration: the lift is reduced, the drag increases and they can unexpectedly stall. Due to the ice in the horizontal and vertical stabilizers, the airplane can lose side or longitudinal control. The largest ice particles, which break upon coming into contact with the engine air intake ducts, can damage the blades or sensors of the turbofans.

Due to the above, critical airplane surfaces must be protected from ice by means of suitable systems. These systems increase the airplane weight and must therefore desirably be as efficient as possible.

To deal with the aforementioned problems, the development of analytical models which allow evaluating both the accumulated ice and the effect caused by it on the airplane is considered to be essential. These analytical models also allow a more efficient evaluation of the protection systems against ice during the airplane design stage.

The known analytical models which allow calculating ice formations generally include at least the following modules:
   A fluid field calculation module for calculating the fluid field around the surface in question.
   A water uptake calculation module.
   An ice growth and thermodynamic balance calculation module.

The water uptake module comprises a simulator which must accurately represent the water accumulation process occurring when an aircraft traverses a cloud containing water droplets that are cold enough to become frozen, for the purpose of being able to calculate the uptake parameter of the surface, which parameter will be used in the ice growth and thermodynamic balance calculation module.

The way to obtain the uptake parameter, using Lagrange modeling, consists of carrying out a massive droplet projection, resolving the paths of such droplets and studying the impacts occurring on the outer aircraft surface. In this situation, it is important to establish the initial water droplet distribution in the cloud and the physical properties of such droplets because their paths will depend on such properties, which paths are required to determine the uptake amount (total uptake efficiency), distribution (local uptake efficiency) and extension (limits of the impacted surface).

In the known art, the way to obtain the local uptake efficiency parameter for three-dimensional cases consists of calculating the area ratio between the triangles formed by three water droplets coming out of the projection area and the triangle formed by their impacts on the study surface.

Thus, in reference to FIG. 2, the local uptake efficiency parameter is given by the expression $$\beta = \frac{A2}{A1},$$

where A1 is the area of the triangle that would be formed by three close particles on the projection plane, and A2 is the area of the triangle that would be formed by their impact points on the aerodynamic surface.

This parameter is calculated for each of the different particle sizes and the contribution of each particle is added according to the formula:

$$\beta(s) = \sum_{i=1}^{N} n_i \beta_i(s),$$

where $n_i$ is the liquid mass fraction associated to the size of particle i and N is the number of particle sizes used to characterize the distribution. $\beta_i$ is the local uptake efficiency parameter calculated for particle i.

This process requires carrying out as many uptake calculations as different particle sizes considered in the distribution, as it is not possible to use different particle sizes in the same calculation because the local uptake parameter calculation is based on the hypothesis that all the particles that come out within triangle A1 impact on the triangle defined by A2 (mass continuity condition), which hypothesis is only valid if it is considered that all the particles have the same size.

The method known in the art therefore has a high computation cost, especially when working with very complex geometries. The present invention is aimed at solving this drawback both in the calculation of water droplet uptake by aircraft surfaces and in the calculation of the uptake of another type of particles by another type of surfaces moving in a flow current.

SUMMARY OF THE INVENTION

An object of the present invention is to provide a computer-aided method for predicting water particle uptake, or the uptake of other particles, by the surface of an object moving in a flow current, such as an aircraft, subjected to a shower of said particles, minimizing the necessary computation resources for that purpose.

This and other objects are achieved by providing a computer-aided method for predicting water particle uptake by a surface of an object moving in a flow current, characterized in that it comprises the following steps:
   preparing a discrete model of said object and the surrounding flow, including a particle projection area (21) formed by a mesh of cells (23) with an identical size, and a mesh of cells (13) of said surface (11);
   simulating the projection of particles with a different size from said projection area (21) on the surface (11), both the density Di of projected particles and their size distribution being identical for the cell (23);

obtaining for each cell (13) of said surface (11) the local uptake efficiency parameter β by dividing the density Df of particles impacting against said cell (13) by the density Di of particles projected from the projection area (21).

In a preferred embodiment, said object is an aircraft and said particles are water droplets. A method that is useful for predicting ice formation on aircraft surfaces is thus achieved.

Other features and advantages of the present invention will be evident from the following detailed description of illustrative embodiments of its object in relation to the attached figures.

DETAILED DESCRIPTION OF THE INVENTION

Figure 1:
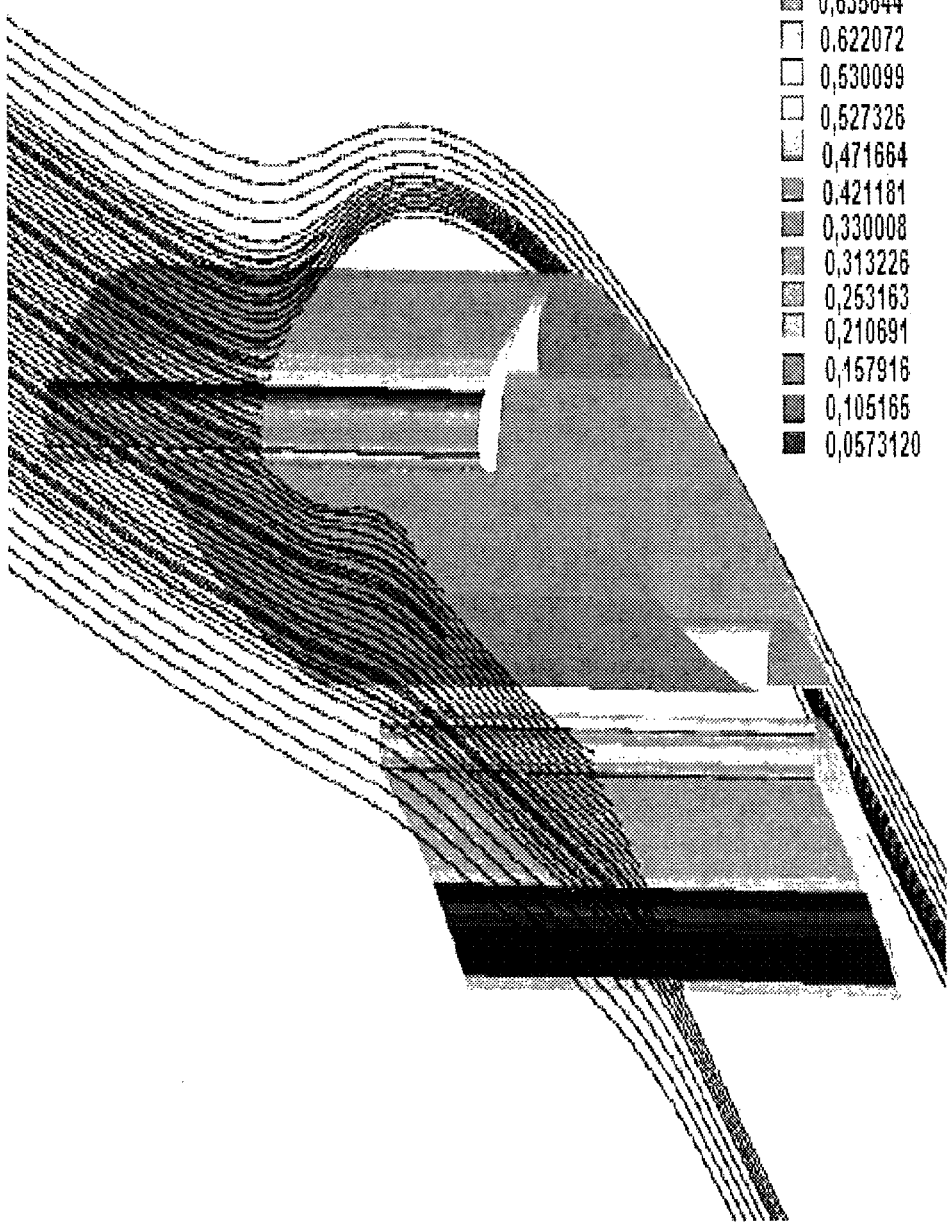
FIG. 1 shows the paths of water droplets impacting on an aerodynamic surface.
Figure 2:
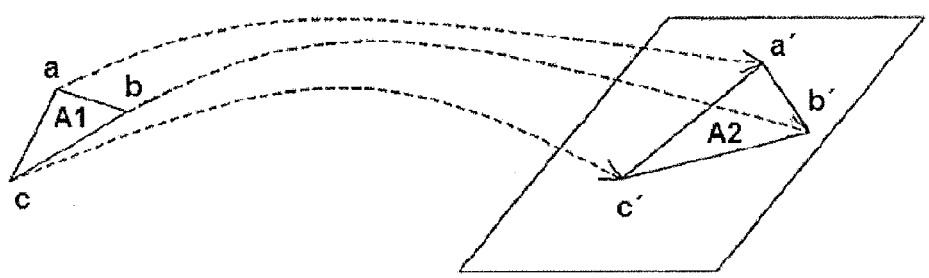
FIG. 2 shows a known process for calculating the local uptake efficiency parameter.
Figure 3:
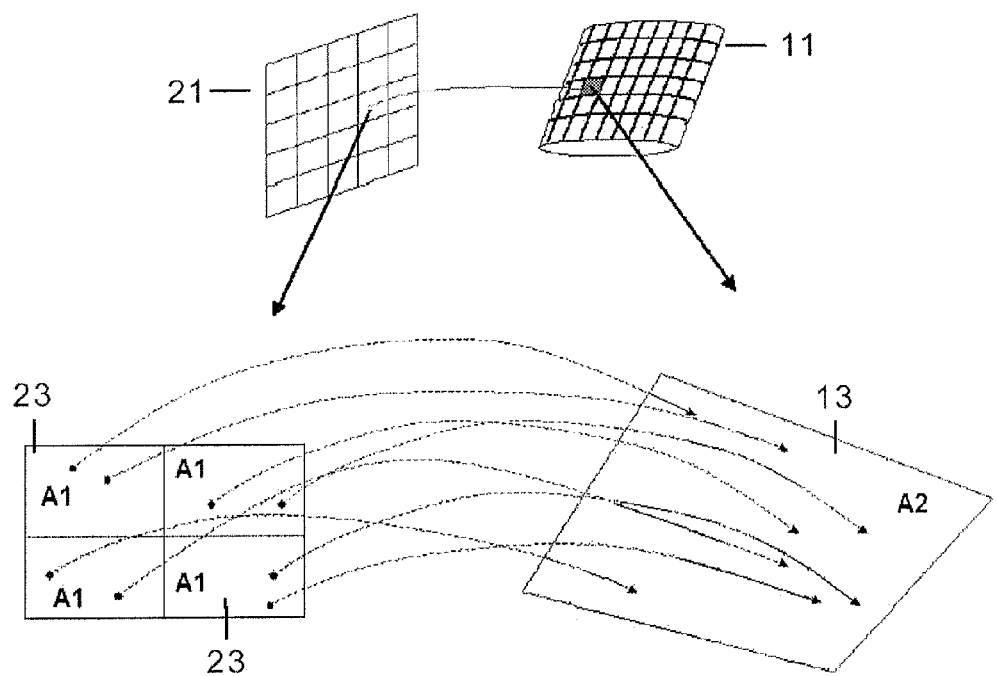
FIG. 3 shows the process for calculating the local uptake efficiency parameter according to the method of the present invention.

An embodiment of the computer-aided method for predicting water droplet uptake by an aerodynamic aircraft surface comprising the following stages: Model Preparation, Calculation and Simulation and Analysis, will be described below, essentially with reference to FIG. 3.

I. Model Preparation

A finite element model is prepared like in the method known in the art, importing the structural geometry of the aerodynamic surface 11.

For the specific purposes of the method object of the present invention, the model includes on one hand a water droplet projection area 21 formed by a mesh of cells 23 with an identical size, and on the other hand, the aerodynamic surface 11 formed by a mesh of cells 13 to enable the simulation of the paths of the droplets projected from area 21 and the determination of which of them impact the aerodynamic surface 11.

One and the same water droplet distribution is assigned to each cell 23, which distribution can be that characterized by Langmuir D, for example, which would have the following values indicated in Table 1 for an average water droplet size of 20 microns.

TABLE 1

| Percentage over water content | Diameter ratio | Water droplet size in microns |
|---|---|---|
| 0.05 | 0.31 | 6.2 |
| 0.10 | 0.52 | 10.4 |
| 0.20 | 0.71 | 14.2 |
| 0.30 | 1.00 | 20.0 |
| 0.20 | 1.37 | 27.4 |
| 0.10 | 1.74 | 34.8 |
| 0.05 | 2.22 | 44.4 |

II. Calculation

According to the present invention, the local uptake parameter of a cell 13 (hereinafter, the method object of the present invention does not have any significant differences with the method known in the state of the art) is calculated by means of the formula $$\beta = \frac{N2/A2}{N1/A1},$$

where N2 is the number of droplets impacting on cell 13, with an area A2, of the aerodynamic surface 11 and N1 is the number of droplets coming out of cell 23, with an area A1, of the projection area 21. As has already been indicated, the projection area is formed by cells 23 with an identical surface and the same number of droplets N1 comes out of each of them.

Defining the density Di of droplets projected from cell 23 as the ratio between the number of droplets N1 projected from cell 23 and its surface A1 and, similarly, the density Df of droplets impacting cell 13 as the ratio between the number of droplets N2 impacting therein and its surface A2, the local uptake efficiency parameter is thus defined by the ratio between Di and Df.

In the uptake parameter calculation of each cell 13 of the surface 11, Di will therefore be constant and Df will vary according to the number of the impacts therein of the droplets projected from all the cells 23 of the projection area 21.

III. Simulation and Analysis

The ice profile on the aerodynamic surface 11 can be obtained following the same steps of the prior art from the local uptake efficiency parameters obtained for each cell 13 by means of a single calculation, using a certain water droplet distribution.

As the person skilled in the art will understand, the method object of the present invention can be applied to any body which, immersed in a fluid, is subjected to a shower of particles the size of which is small enough to consider that the particles do not interact with one another and their movement in turn does not modify the fluid containing them.

The modifications comprised in the scope of the following claims can be introduced in the preferred embodiment which has just been described.

The invention claimed is:

1. A computer-aided method implemented on a computer for predicting particle uptake by a surface of an object moving in a flow current, comprising the following steps:
    preparing, using the computer, a discrete model of said object and surrounding flow, including a projection area for projecting particles formed by a first mesh of cells with particles of an identical size, and a second mesh of cells forming said surface, enabling simulation of paths of the particles projected from the projection area and determination of which of the particles impact said surface;
    simulating, using the computer, a projection of particles with a different size from said projection area on said surface, both a density Di of the projected particles and a size distribution of the projected particles being identical for a first cell; and
    calculating, using the computer, for each second cell of said surface a local uptake efficiency parameter by dividing a density Df of the particles impacting against a second cell by the density Di of the projected particles from the projection area formed by the first cells,
    wherein a single calculation is used for all different particle densities.

2. The method according to claim 1, in which said surface is an aerodynamic aircraft surface and the particles are water droplets.

* * * * *